United States Patent
Yoon et al.

(10) Patent No.: US 9,113,049 B2
(45) Date of Patent: Aug. 18, 2015

(54) APPARATUS AND METHOD OF SETTING PARKING POSITION BASED ON AV IMAGE

(71) Applicant: Hyundai Motor Company, Seoul (KR)

(72) Inventors: Dae Joong Yoon, Gyeonggi-do (KR); Jae Seob Choi, Gyeonggi-do (KR); Eu Gene Chang, Gunpo (KR)

(73) Assignee: Hyundai Motor Company, Seoul (KR)

( * ) Notice: Subject to any disclaimer, the term of this patent is extended or adjusted under 35 U.S.C. 154(b) by 372 days.

(21) Appl. No.: 13/688,152

(22) Filed: Nov. 28, 2012

(65) Prior Publication Data

US 2013/0265428 A1     Oct. 10, 2013

(30) Foreign Application Priority Data

Apr. 4, 2012    (KR) .......................... 10-2012-0035016

(51) Int. Cl.
    *H04N 7/18*        (2006.01)
    *G06K 9/00*        (2006.01)

(52) U.S. Cl.
    CPC ............ *H04N 7/183* (2013.01); *G06K 9/00812* (2013.01)

(58) Field of Classification Search
    CPC .............................. H04N 7/183; G09K 9/0082
    USPC ............... 348/118, 135, 148; 340/932.2, 436; 701/28, 300, 431
    See application file for complete search history.

(56) References Cited

U.S. PATENT DOCUMENTS

| | | | |
|---|---|---|---|
| 6,356,828 B1 * | 3/2002 | Shimizu et al. | 701/41 |
| 7,606,644 B2 * | 10/2009 | Kato et al. | 701/36 |
| 7,659,835 B2 * | 2/2010 | Jung | 340/932.2 |
| 2007/0100543 A1 | 5/2007 | Kato et al. | |
| 2008/0136673 A1 | 6/2008 | Jung | |
| 2009/0040068 A1 * | 2/2009 | Oyobe et al. | 340/932.2 |
| 2009/0085771 A1 * | 4/2009 | Wu et al. | 340/932.2 |
| 2010/0283633 A1 * | 11/2010 | Becker et al. | 340/932.2 |
| 2011/0013201 A1 * | 1/2011 | Scherl et al. | 356/628 |

FOREIGN PATENT DOCUMENTS

| | | |
|---|---|---|
| JP | 2007118912 A | 5/2007 |
| KR | 1020080024772 A | 3/2008 |
| KR | 20100096757 A | 9/2010 |
| KR | 20100112408 A | 10/2010 |

* cited by examiner

*Primary Examiner* — Victor Kostak
(74) *Attorney, Agent, or Firm* — Mintz Levin Cohn Ferris Glovsky and Popeo, P.C.; Peter F. Corless

(57) ABSTRACT

Disclosed herein are an apparatus and a method of setting a parking position based on an around-view (AV) image. After the continuous AV images of the parking space are obtained in cooperation with an around-view monitoring (AVM) system, a parking space, designated by a driver in various designating schemes, is set to a parking position, allowing the driver to select the parking space and easily identify a surrounding space limitations of the selected parking space.

8 Claims, 5 Drawing Sheets

APPARATUS AND METHOD OF SETTING PARKING POSITION BASED ON AV IMAGE

CROSS-REFERENCE

This application is based on and claims priority from Korean Patent Application No. 10-2012-0035016, filed on Apr. 4, 2012, the disclosure of which is incorporated herein in its entirety by reference.

BACKGROUND OF THE INVENTION

1. Field of the Invention

The present invention relates to an apparatus and method of setting a parking position based on an around-view (AV) image, and more particularly, to a technology of recognizing a parking space in continuous AV images obtained in cooperation with an around-view monitoring (AVM) system and then setting a parking space designated by a driver, in various designating schemes, as a parking position.

2. Description of the Related Art

The left, right and rear driver views in a vehicle are substantially limited since portions of the view are blocked by a vehicle body, also known as blind spots.

In order to solve this problem, a side mirror, an interior mirror, and the like, are mounted in the vehicle so that the driver may indirectly view the left, right and the rear of the vehicle. However, the additional mirrors do not offer complete visibility of the blind spots. Therefore, a technology of mounting cameras in a vehicle which display around-view (or 360 degree) images to a driver has been recently developed.

As an example, there exists an around-view monitoring (AVM) system that is configured to display the surroundings of a vehicle, at a 360 degree angle, through cameras installed on all sides of the vehicle. The AVM system performs view (e.g., top view) transformation on photographed images through each of the cameras to generate AV images to the driver showing the surroundings of the vehicle at the 360 degree angle, thereby increasing blind spot visibility. Since the AV image generated by the AVM system is merely shown on a display, there are, however, utility limitations.

The foregoing is intended merely to aid in the understanding of the background of the present invention, and is not intended to mean that the present invention falls within the purview of related art that is already known to those skilled in the art.

SUMMARY OF THE INVENTION

Accordingly, the present invention has been made to solve the above-mentioned problems associated with the prior art while advantages achieved by the prior art are maintained intact. The present invention is provides an apparatus and method of setting a parking position based on an around-view (AV) image that allows a driver to select a parking space and easily perceive surrounding space limitations of the selected parking space by viewing the parking space in continuous AV images obtained in cooperation with an around-view monitoring (AVM) system and additionally, setting a parking space, designated by the driver in various designating schemes, to a parking position.

In a general aspect of the present invention, an apparatus for setting a parking position based on an AV image is disclosed. The apparatus includes an AV image collecting unit that is configured to collect AV images; a parking space recognizing unit that is configured to display and detect parking spaces in the AV images; a designation region inputting unit configured to receive a designated parking space selected by a driver; a designation region recognizing unit configured to detect/recognize the designated parking space received in the designation region inputting unit in cooperation with the parking space recognizing unit to determine whether the designated parking space is effective/acceptable for receiving the vehicle; a display unit configured to display the AV images of the designated parking space; and a parking position setting unit configured to set the designated parking space to a parking position when the designated parking space is effective. The designated parking space is effective/acceptable when the parking space is substantially large to accommodate the vehicle (e.g., large enough to accommodate the vehicle).

In another embodiment of the present invention, a method of setting a parking position based on an AV image is disclosed. The method includes collecting, in an AV image collecting unit executed by a processor, AV images; recognizing, in a parking space recognizing unit executed by the processor, parking spaces in the collected AV images; receiving, in a designation region inputting unit, a designated parking space from a driver; displaying, in a display unit (e.g., screen), the collected the AV images and the designated parking space; recognizing, in a designation region recognizing unit executed by the processor, the designated parking space received in the designation region inputting unit in cooperation with the parking space recognizing unit to determine whether the designated parking space is effective; and setting in a parking position setting unit, the designated parking space to a parking position when the designated parking space is effective. The designated parking space is effective when the parking space is substantially large to accommodate the vehicle (e.g., large enough to accommodate the vehicle).

BRIEF DESCRIPTION OF THE DRAWINGS

The above and other objects, features and advantages of the present invention will be more clearly understood from the following detailed description taken in conjunction with the accompanying drawings, in which.

DESCRIPTION OF PREFERRED EMBODIMENTS

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Although the below exemplary embodiments are described as using a plurality of units to perform the above process, it is understood that the above processes may also be performed by a single controller or unit. Additionally, it is well understood that a single processor or a plurality of processors may be utilized to execute each of the above described units. Accordingly, these units may be embodied as hardware or software which is executed by a processor or controller.

Furthermore, the control logic of the present invention may be embodied as non-transitory computer readable media on a computer readable medium containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

Hereinafter, exemplary embodiments of the present invention will be described in detail with reference to the accompanying drawings.

Figure 1:
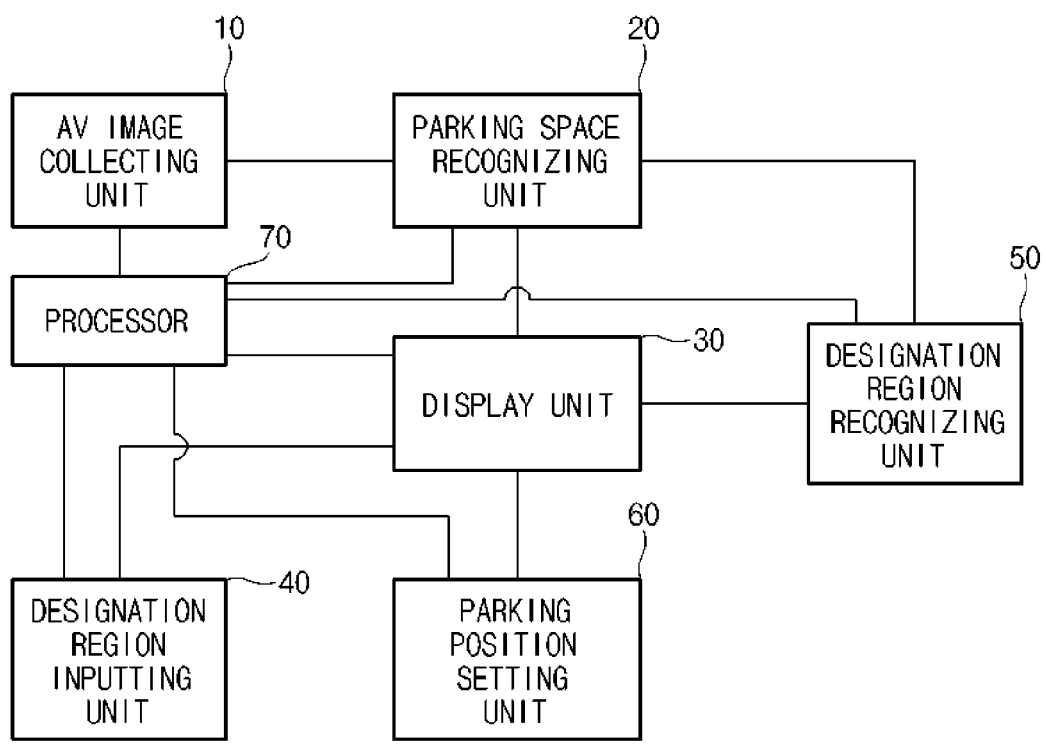
FIG. 1 is an exemplary configuration diagram of an apparatus for setting a parking position based on an around-view (AV) image according to an exemplary embodiment of the present invention.

FIG. 1 illustrates an exemplary apparatus for setting a parking position based on an around-view (AV) image is configured to include an AV image collecting unit 10, a parking space recognizing unit 20, a display unit 30, a designation region inputting unit 40, a designation region recognizing unit 50, and a parking position setting unit 60. These units may be executed by a single processor or a plurality of processors each configured to execute the specific functions of the above described units 10-60.

The AV image collecting unit 10 continuously collects AV images generated in an around-view monitoring (AVM) system mounted in a vehicle in cooperation with the AVM system. The AV image is an image generated by performing a view (e.g., top view) transformation process on the images photographed from optical cameras installed on of all sides of the vehicle. In this embodiment, AV image means an image displaying the surroundings of a vehicle at a 360 degree angle around the vehicle. Here, the view transformation process means a process of generating an image of a top view of the vehicle.

Next, the parking space recognizing unit 20 recognizes parking spaces in the AV images collected in the AV image collecting unit 10. Hereinafter, a parking space recognizing process of the parking space recognizing unit 20 will be described with reference to FIGS. 2A to 2D. First, the AV image collecting unit 10 continuously collects the AV images, whereby the AV images vary according to vehicle movement. Then, the parking space recognizing unit 20 continuously compares two or more AV images, to recognize/identify or detect a trajectory of the vehicle and to recognize the parking spaces.

Figure 2A:
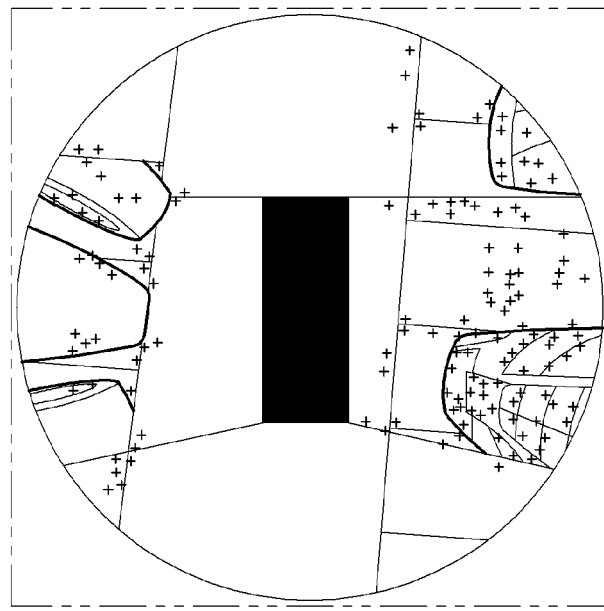
FIG. 2A is an exemplary diagram illustrating a plurality of feature points found in an AV image.

As illustrated in FIG. 2A, the parking space recognizing unit 20 utilizes corner detection technologies to detect feature points by comparing the two AV images. This corner detection technology, which is a well-known technology for recognizing an image by extracting corners of objects included in the image, is generally utilized to detect a difference between the continuous images. Accordingly, a detailed description has been omitted. Particularly, corner information is important in an image processing and recognizing field. Therefore, in the exemplary embodiment of the present invention, main feature points are extracted using the corner detection technology to recognize the AV image. Preferably, a Harris corner detection technology may be used, but it is not limited thereto.

Figure 2B:
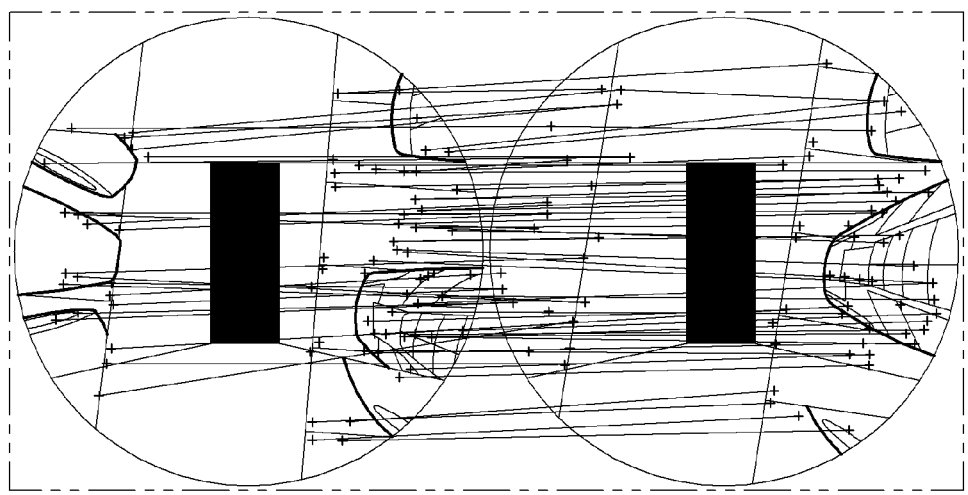
FIG. 2B is an exemplary diagram illustrating a parking space recognition unit matching the plurality of feature points in the AV image.

As illustrated in FIG. 2B, the parking space recognizing unit 20 matches the feature points of the continuous two AV images. The feature points of the continuous two AV images are matched with each other by a normalized cross correlation (NCC) technology. The NCC technology is a well-known technology for normalizing two images that may vary from each other according to an environment and comparing the images. The parking space recognizing unit 20 utilizes the NCC technology to normalize the continuous two AV images that vary from each other due to vehicle movement and to compare the continuous two AV images with each other.

In this case, the parking space recognizing unit 20 utilizes pixel brightness values of a square region (e.g. 7×7) around the feature points in the continuous two AV images as factors of the feature points, normalizes the continuous two AV images using the NCC technology, and matches the respective feature points, thereby making it possible to measure the similarity between the feature points. Here, the size and shape of the region is variable, depending on the characteristics of the image.

Figure 2C:
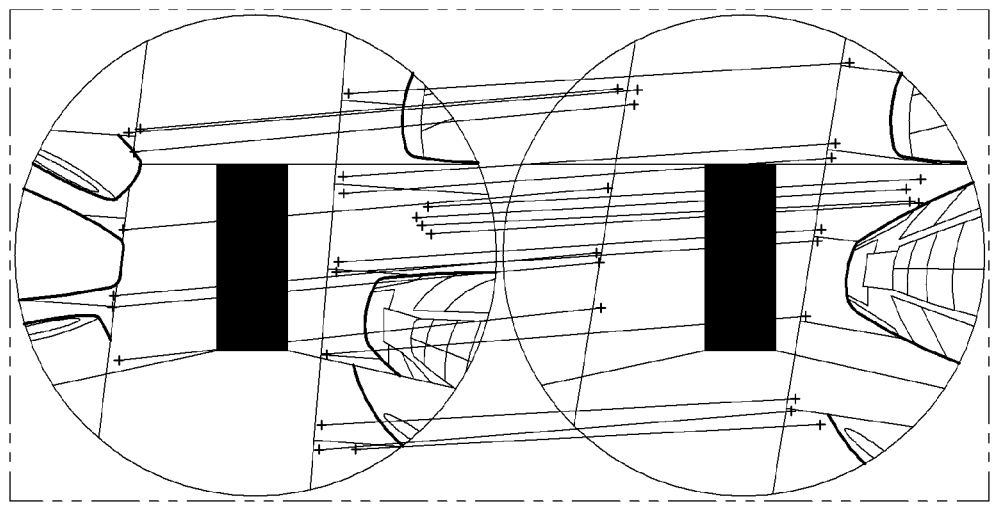
FIG. 2C is an exemplary diagram illustrating a parking space recognition unit deleting a plurality of mismatched feature points.

As illustrated in FIG. 2C, the parking space recognizing unit 20 deletes mismatched feature points when the respective feature points of the normalized two AV images are matched with each other. Further, the parking space recognizing unit 20 extracts a displacement difference and an angle difference between the continuous two AV images through a similarity transformation model and deletes the mismatched feature points through a random sample consensus (RANSAC) technology. The RANSAC technology is a well-understood technology for predicting factors of a mathematical model from a series of data sets including false information (e.g., the mismatched feature points) accordingly a description of which has been omitted from the detailed description. The parking space recognizing unit 20 may recognize and delete the mismatched feature points through the RANSAC technology.

Figure 2D:
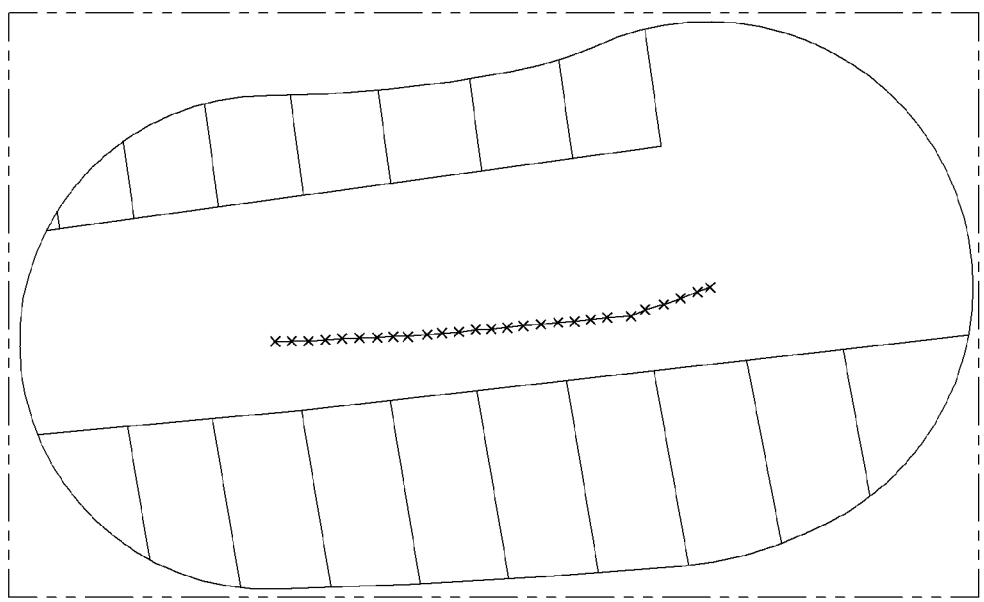
FIG. 2D is an exemplary diagram illustrating matching AV images with each other based on estimated effective points.

Moreover, as illustrated in FIG. 2D, when the mismatched feature points are deleted, the parking space recognizing unit 20 matches the AV images with each other based on estimated matched feature points. Through the above-mentioned process, the parking space recognizing unit 20 may recognize the parking spaces from the continuous AV images. Here, the parking space refers to an empty parking space in which the vehicle may be parked (e.g. the vehicle size may fit in the parking space).

Additionally, the parking space recognizing unit 20 may also include a priority of the recognized parking spaces in cooperation with a smart parking assistance system (SPAS). In particular, the parking space recognizing unit 20 may set the priority of the respective parking spaces at a current point of the vehicle according to ease of parking. Further, the display unit 30 displays the AV images and the designation region inputting unit 40 includes a variety of interfaces to receive a designated parking space from the driver.

For example, the display unit 30 shows a line drawn on the display unit 30 by the driver, using a finger, along a parking line of a parking space and the parking position setting unit 60 sets the corresponding parking space to the parking position. The driver may draw a quadrangular line along a quadrangular parking line or may draw a '⊏' shaped line to park the vehicle from the left to the right. In addition, the driver may also draw dots along a quadrangular edge. As another example, when the driver, using a finger, clicks the parking space or drags the vehicle to the parking space displayed on the display unit 30, the display unit 30 displays the click or the drag, and the parking position setting unit 60 sets the corresponding parking space to the parking position.

Figure 3A:
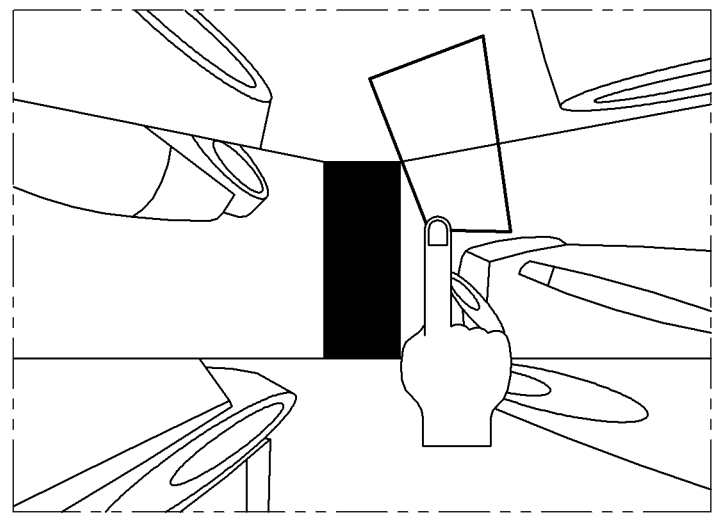
FIG. 3A is an exemplary diagram illustrating a parking space designating scheme according to the exemplary embodiment of the present invention.

As still another example, as illustrated in FIG. 3A, when the driver draws a quadrangle in a region in which the parking line is not present in a displayed AV image the display unit 30 displays the corresponding quadrangle, and the parking position setting unit 60 sets the corresponding quadrangle to the parking space. That is, when the driver draws on the display unit 30, using a finger, display pen, or the like, the quadrangle in the region that is not the parking space, the designation region recognizing unit 50 matches the drawn quadrangle with a coordinate of the AV image based on the AV image recognizing result in the parking space recognizing unit 20. In this case, when parking is possible at a position corresponding to the quadrangle, the parking position setting unit 60 sets the parking space to the parking position.

Figure 3B:
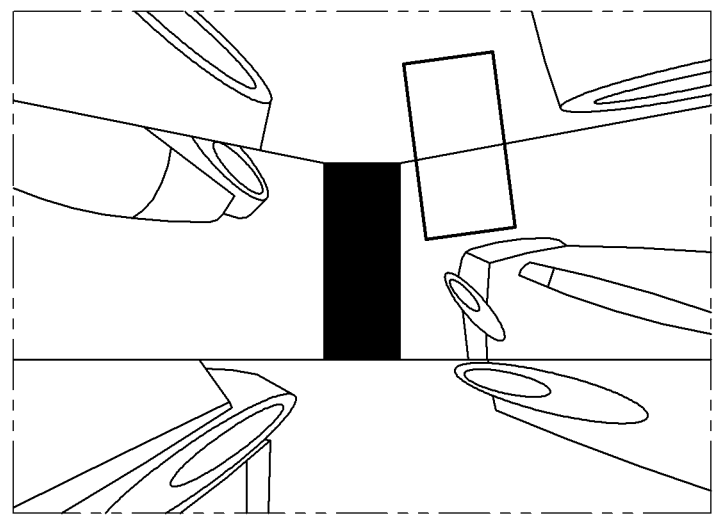
FIG. 3B is an exemplary diagram illustrating a designation region correcting result according to the exemplary embodiment of the present invention.

Next, the designation region recognizing unit 50 compares an actual size of the designated parking space received through the designation region inputting unit 40 with a reference size (horizontal and vertical lengths of a quadrangle at which the parking of the vehicle is possible) to determine whether parking in the particular parking space is possible. The parking position setting unit 60 sets the parking space to the parking position when the parking is possible. In addition, the designation region recognizing unit 50 corrects the quadrangle drawn by the driver to a rectangle as shown in FIG. 3B, which is displayed through the display unit 30. Furthermore, the parking position setting unit 60 sets the designated parking space received through the designation region inputting unit 40, that is, an empty parking space having a parking line, to the parking position.

When the region that is not the parking space is received through the designation region inputting unit 40, the parking position setting unit 60 determines whether the designation region is set to the parking space according to a recognition result of the designation region recognizing unit 50. In particular, when the designation region recognizing unit 50 determines that the designation region is the region in which parking is possible, the parking position setting unit 60 sets the corresponding designation region to the parking space. Additionally, when the designation region recognizing unit 50 determines that the designation region is not the region in which parking is possible, the parking position setting unit 60 does not set the corresponding designation region to the parking space. Instead, the designation region in which an obstacle (e.g., other vehicles, or the like) is not present may be set to the parking space.

Figure 4:
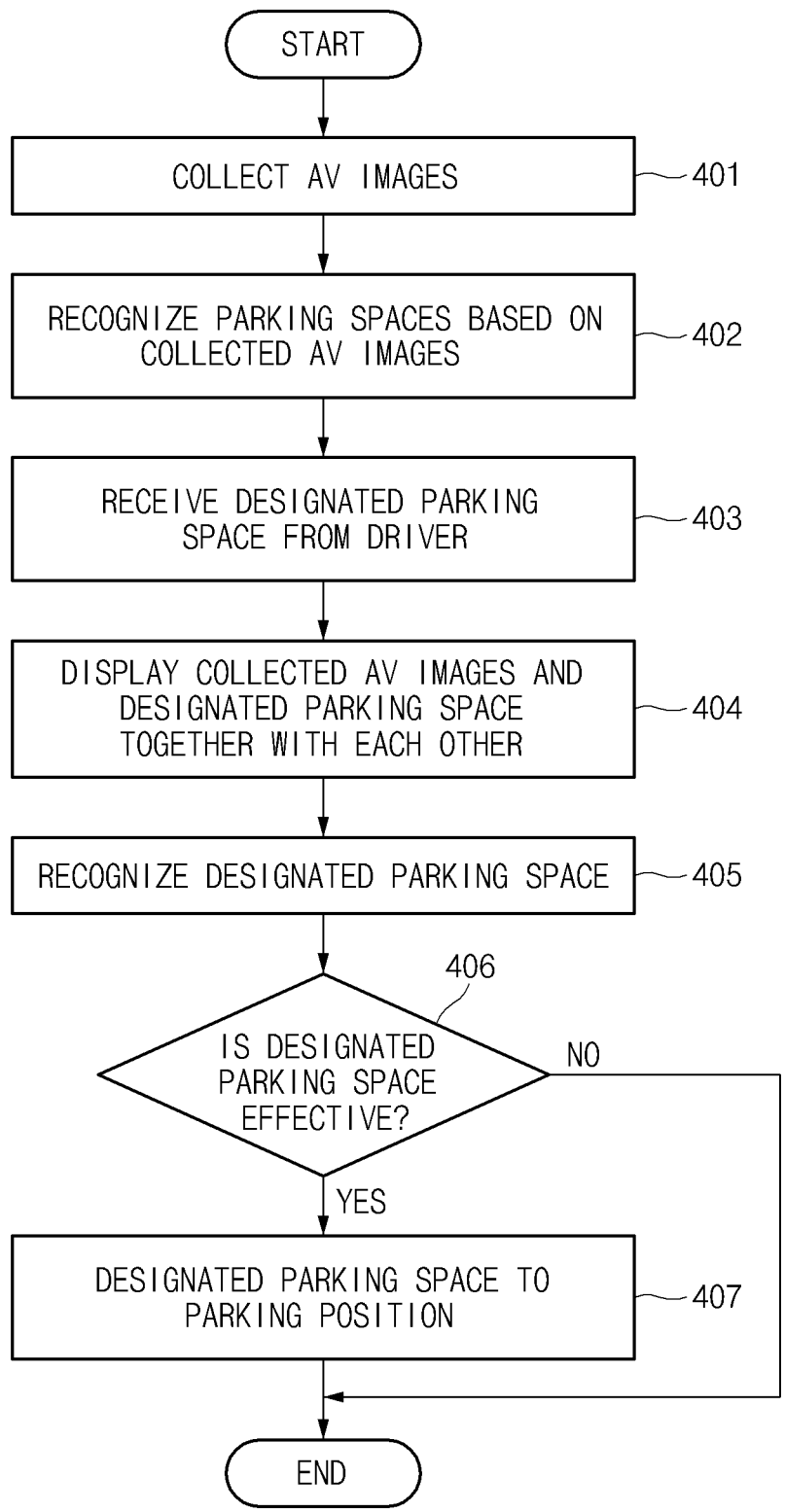
FIG. 4 is an exemplary flow chart of a method setting a parking position based on an AV image according to the exemplary embodiment of the present invention.

In the exemplary embodiment of the present invention, the designation region inputting unit 40 and the display unit 30 may be a touch screen or a touch pad, implemented as a single module. The exemplary flow chart in FIG. 4 illustrates a method for setting a parking position based on an AV image.

First, the AV image collecting unit 10, in cooperation with the AVM system mounted in the vehicle (401), continuously collects AV images. Here, the AVM system includes wide angle cameras installed on all sides of the vehicle. Then, the parking space recognizing unit 20 recognizes parking spaces based on the AV images (402). Further, the designation region inputting unit 40 receives the designated parking space from the driver (403). Thereafter, the display unit 30 displays the collected AV images and the designated parking space together, in an overlapping manner (404). Then, the designation region recognizing unit 50, in cooperation with the parking space recognizing unit 20, recognizes the designated parking space received in the designation region inputting unit 40 (405). Next, the designation region recognizing unit 50 determines whether the designated parking space is effective (406). The designated parking space is effective if the designation region recognizing unit determines that the designated parking space is substantially large to accommodate the vehicle (e.g., large enough to accommodate the vehicle).

When it is determined (406) that the designated parking space is effective, the parking position setting unit 60 sets the designated parking space to the parking position (407) When it is determined (406) that the designated parking space is not effective, the parking position setting unit 60 does not set the designated parking space to the parking position. In this case, the parking position setting unit 60 may inform the driver that the parking is ineffective and then the method ends. Furthermore, the parking position setting unit 60 may inform the driver that the parking is ineffective and display a message requesting the designation of a new parking space. Through the above-mentioned process, the driver may select the parking space and easily recognize the surrounding space limitations of the selected parking space.

As set forth above, according to the exemplary embodiments, after the parking space in the continuous AV images is recognized, the parking space designated by the driver in various designating schemes is selected to the parking position, allowing the driver to select the parking space and easily recognize the surrounding space limitations of the selected parking space.

What is claimed is:

1. An apparatus for setting a parking position based on an around-view (AV) image, the apparatus comprising:
    an AV image collecting unit configured to collect a plurality of AV images;
    a parking space recognizing unit configured to identify a plurality of parking spaces in the plurality of AV images;
    a designation region inputting unit configured to receive a designated parking space from a driver;
    a designation region recognizing unit configured to identify the designated parking space received in the designation region inputting unit in cooperation with the parking space recognizing unit to determine whether the designated parking space is effective wherein the designated parking space is effective when the parking space is of a size capable of accommodating a vehicle;
    a display unit configured to display together the plurality of AV images; and
    a parking position setting unit configured to set the designated parking space to a parking position when the designated parking space is effective, wherein the designation region inputting unit receives a region of a quadrangle drawn by the driver in the displayed AV image as the designated parking space.

2. The apparatus of claim 1, wherein the designation region recognizing unit corrects the quadrangle received through the designation region inputting unit to a rectangle.

3. The apparatus of claim 2, wherein the display unit displays the rectangle instead of the quadrangle.

4. The apparatus of claim 1, wherein the designation region recognizing unit compares an actual size of the designated parking space received in the designation region inputting unit with a reference size to determine an effective designated parking space.

5. A method of setting a parking position based on an around-view (AV) image, the method comprising:
   collecting, in an AV image collecting unit, a plurality of AV images;
   recognizing, in a parking space recognizing unit, a plurality of parking spaces in the plurality of AV images;
   receiving, in a designation region inputting unit, a designated parking space from a driver;
   displaying together in a display unit, the plurality of AV images and the designated parking space;
   recognizing, in a designation region recognizing unit, the designated parking space received in the designation region inputting unit in cooperation with the parking space recognizing unit to determine an effective designated parking space, wherein the designated parking space is effective when the parking space is of a size capable of accommodating a vehicle; and
   setting, in a parking position setting unit, the designated parking space to a parking position,
   wherein receiving the designated parking space further includes receiving as the designated parking space a region of a quadrangle drawn by the driver in the displayed AV image.

6. The method of claim 5, wherein determining whether the designated parking space is effective further includes correcting the received quadrangle to a rectangle.

7. The method of claim 6, wherein the rectangle is displayed by the display unit.

8. The method of claim 5, wherein determining whether the designated parking space is effective further includes comparing an actual size of the designated parking space is with a reference size to determine an effective designated parking space.

* * * * *